United States Patent
Goel et al.

(10) Patent No.: US 8,498,305 B1
(45) Date of Patent: *Jul. 30, 2013

(54) PACKET AGGREGATION

(75) Inventors: Sandesh Goel, Noida (IN);
Prabhashankar Shastry, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 334 days.

This patent is subject to a terminal disclaimer.

(21) Appl. No.: 12/950,742

(22) Filed: Nov. 19, 2010

Related U.S. Application Data

(63) Continuation of application No. 11/454,102, filed on Jun. 15, 2006, now Pat. No. 7,839,876.

(60) Provisional application No. 60/761,904, filed on Jan. 25, 2006, provisional application No. 60/801,844, filed on May 19, 2006.

(51) Int. Cl.
*H04J 3/24* (2006.01)

(52) U.S. Cl.
USPC .......................... 370/412; 370/469; 370/473

(58) Field of Classification Search
None
See application file for complete search history.

(56) References Cited

U.S. PATENT DOCUMENTS

| | | | |
|---|---|---|---|
| 4,901,277 A | 2/1990 | Soloway et al. | |
| 5,799,305 A | 8/1998 | Bortvedt et al. | |
| 6,430,617 B1 * | 8/2002 | Britt et al. | 709/224 |
| 6,870,812 B1 | 3/2005 | Kloth et al. | |
| 7,391,769 B2 * | 6/2008 | Rajkumar et al. | 370/389 |
| 7,420,988 B1 * | 9/2008 | Grossman | 370/466 |
| 7,451,228 B2 * | 11/2008 | Patel | 709/232 |
| 7,474,676 B2 * | 1/2009 | Tao et al. | 370/469 |
| 7,492,789 B2 * | 2/2009 | Shvodian | 370/469 |
| 7,523,188 B2 | 4/2009 | Teraslinna | |
| 7,738,375 B1 * | 6/2010 | Vinokour et al. | 370/232 |
| 2004/0064582 A1 | 4/2004 | Raghunath et al. | |
| 2004/0179475 A1 * | 9/2004 | Hwang et al. | 370/229 |
| 2004/0264396 A1 | 12/2004 | Ginzburg et al. | |
| 2007/0014268 A1 | 1/2007 | Kim et al. | |
| 2008/0049654 A1 * | 2/2008 | Otal et al. | 370/311 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

*Primary Examiner* — Kevin C Harper
*Assistant Examiner* — Rhonda Murphy

(57) ABSTRACT

An apparatus including an input circuit, a control circuit, a queue, an aggregation circuit, and an output circuit. The input circuit is configured to receive packets. The control circuit is configured to enable aggregation when a rate at which the input circuit receives the packets is greater than a predetermined rate. The queue is configured to store the packets from the input circuit when aggregation is enabled. The aggregation circuit is configured to generate aggregate packets when aggregation is enabled. The aggregation circuit is configured to generate each of the aggregate packets by aggregating at least one of the packets stored in the queue. The output circuit is configured to receive (i) the aggregate packets when aggregation is enabled and (ii) the packets from the input circuit when aggregation is disabled.

26 Claims, 5 Drawing Sheets

OTHER PUBLICATIONS

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11 b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11 g1D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

802.11 n; IEEE P802.11-04/0889r6; Wireless LANs, TGn Sync Proposal Technical Specification; 131 pages May 2005.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

ANSI/IEEE Std 802.11, 1999 Edition; Information technology—Telecommunications and information exchange between systems—Local metropolitan area networks—Specific requirements—Park 11: Wireless LAN Medium Access Control (MAC) and Physical Layer (PHY) Specifications; LAN/MAN Standards Committee of the IEEE Computer Society; 531 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications; Further Higher-Speed Physical Layer Extension in the 2.4 GHz Band; LAN/MAN Standards Committee of the IEEE Computer Society; 53 pages.

802.11n; IEEE P802.11-04/0889r6; Wireless LANs, TGn Sync Proposal Technical Specification; May 2005, 131 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 894 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 24 pages.

* cited by examiner

PACKET AGGREGATION

CROSS-REFERENCE TO RELATED APPLICATIONS

This application claims the benefit of U.S. application Ser. No. 11/454,102, filed Jun. 15, 2006, which claims the benefit of U.S. Provisional Patent Application Ser. No. 60/761,904, filed Jan. 25, 2006, and U.S. Provisional Patent Application Ser. No. 60/801,844, filed May 19, 2006, the disclosures thereof incorporated by reference herein in their entirety.

BACKGROUND

The present invention relates generally to data communications. More particularly, the present invention relates to packet aggregation.

Multiple-input multiple-output (MIMO) data communication systems enable physical-layer (PHY) transmission rates as high as 300 Mbps. At such high rates, the total transmission time for a typical 1500-byte packet is very short, and the other per-packet overheads such as preambles, PHY header, inter-packet gap, and the like start to limit the achievable throughput of such systems.

One solution is to aggregate multiple application-level packets into a single aggregated packet. For example, the draft IEEE standard 802.11n describes aggregating multiple Media Access Control (MAC) Service Data Units (MSDUs) into a single Aggregate MSDU (A-MSDU). But when aggregation should occur, and how many packets should be aggregated at a time, remain open questions.

SUMMARY

In general, in one aspect, the invention features an apparatus comprising: an input circuit to receive packets of data; an output circuit to receive the packets of data from the input circuit when aggregation of the packets of data is not enabled; a queue to receive the packets of data from the input circuit when aggregation of the packets of data is enabled; a control circuit to enable aggregation of the packets of data on occurrence of at least one of a rate of receiving the packets of data into the queue is greater than a predetermined threshold rate, and a number of the packets of data present in the output circuit is greater than a first predetermined threshold number; and an aggregation circuit to generate aggregate packets each comprising a plurality of the packets of data received into the queue, to transfer each aggregate packet to the output circuit when a number of the packets of data in the aggregate packet is greater than a second predetermined threshold number, and to transfer the aggregate packet to the output circuit when a number of the packets of data in the aggregate packet is less than, or equal to, the second predetermined threshold number, on occurrence of at least one of a predetermined interval elapses, wherein the predetermined interval begins when the queue is empty when receiving one of the packets of data, and a number of the aggregate packets present in an input circuit of a further apparatus receiving the aggregate packets from the output circuit is less than a third predetermined threshold number.

The details of one or more implementations are set forth in the accompanying drawings and the description below. Other features will be apparent from the description and drawings, and from the claims.

Figure 1:
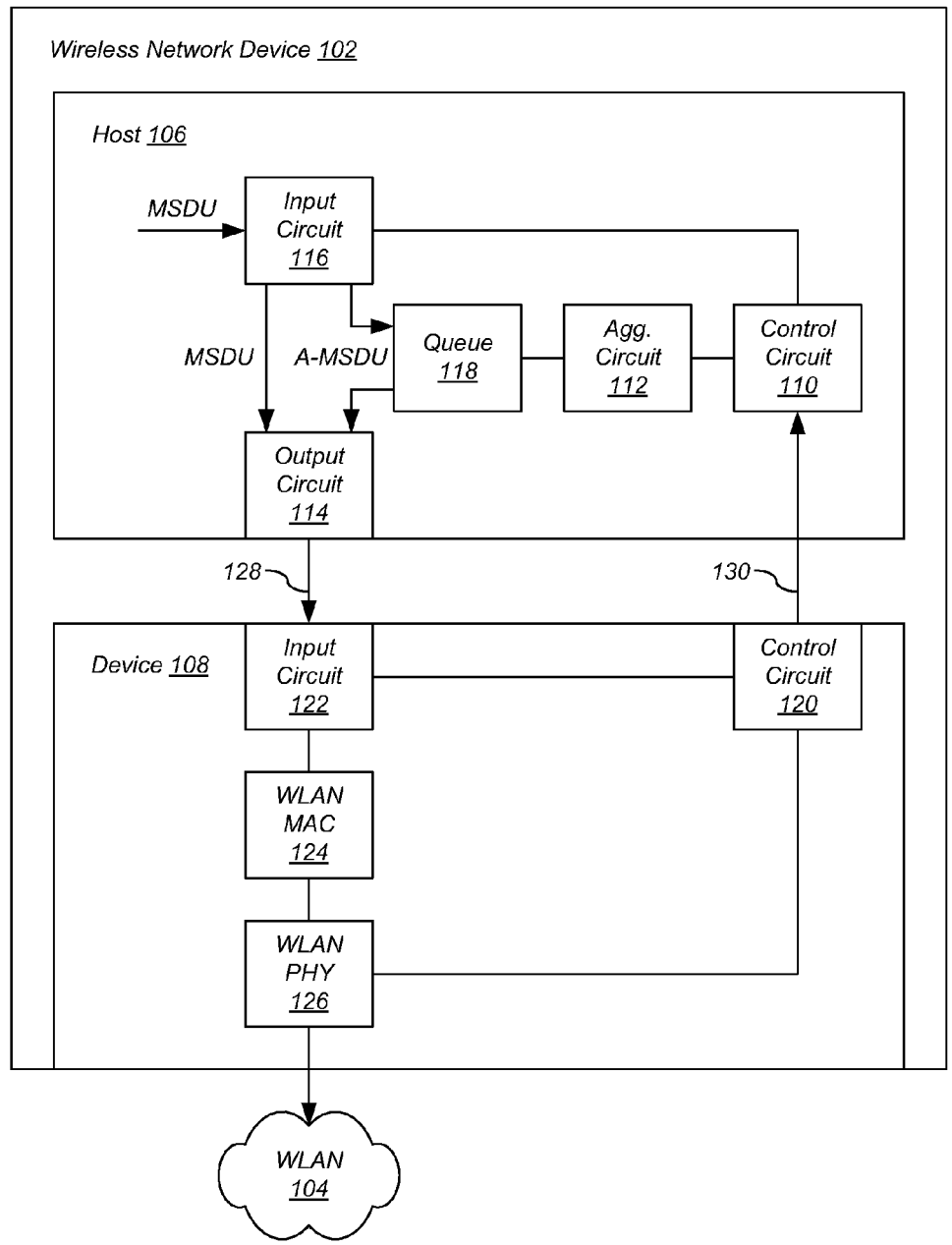
FIG. 1 shows a wireless network device for aggregating packets of data for transmission over a wireless local-area network (WLAN) according to a preferred embodiment of the present invention.

The leading digit(s) of each reference numeral used in this specification indicates the number of the drawing in which the reference numeral first appears.

DETAILED DESCRIPTION

Embodiments of the present invention provide packet aggregation according to several techniques, which can be used alone or in combination.

FIG. 1 shows a wireless network device 102 for aggregating packets of data for transmission over a wireless local-area network (WLAN) 104 according to a preferred embodiment of the present invention. Wireless network device 102 is preferably compliant with one or more of IEEE standards 802.11, 802.11a, 802.11b, 802.11g, 802.11n, 802.16, and 802.20. Wireless network device 102 preferably aggregates multiple Media Access Control (MAC) Service Data Units (MSDUs) into single Aggregate MSDUs (A-MSDU) for transmission over WLAN 104. However, while embodiments of the present invention are described in terms of MSDUs, A-MSDUs, and wireless networks, other embodiments employ other sorts of packets, aggregate packets, networks and data channels, as will be apparent to one skilled in the relevant arts after reading this description.

Wireless network device 102 comprises a host 106 and a device 108. Host 106 comprises a control circuit 110, an aggregation circuit 112, an output circuit 114, an input circuit 116, and a queue 118. Device 108 comprises a control circuit 120, an input circuit 122, a WLAN media access controller (MAC) 124, and a WLAN physical-layer device (PHY) 126. Output circuit 114 of host 106 and input circuit 122 of device 108 communicate over a data channel 128. Control circuits 110 and 120 communicate over a control channel 130.

Host 106 can be implemented, for example, as a general-purpose computer, with control circuit 110 implemented as a general-purpose processor executing a non-real-time operating system. Device 108 is preferably implemented as a system-on-a-chip with control circuit 120 implemented as a special-purpose processor executing a real-time operating system. Data channel 128 and control channel 130 can be implemented as one or more interfaces according to a standard such as Peripheral Component Interconnect (PCI), PCI Express, Mini PCI, PC card, Universal Serial Bus, Firewire, and the like. Wireless network device 102 can be implemented as a switch, router, network interface controller (NIC), and the like.

Figure 2:
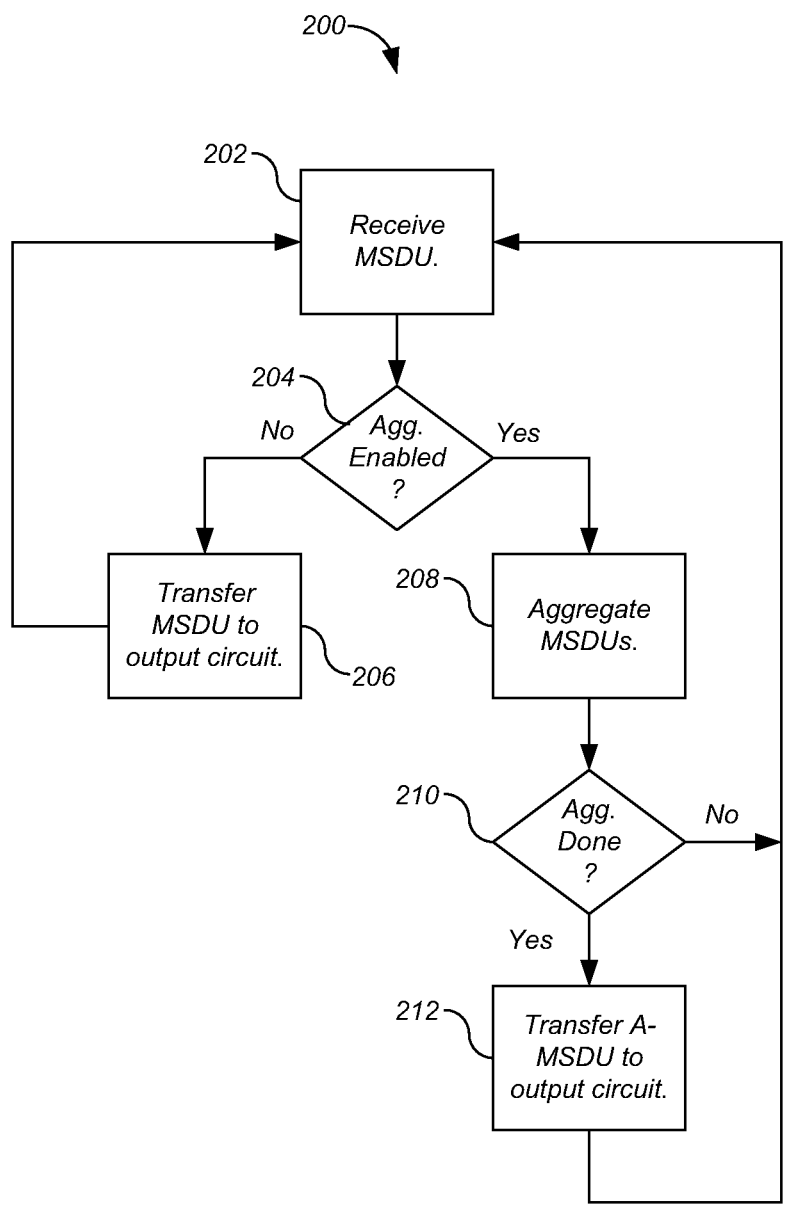
FIG. 2 shows a process for wireless network device according to a preferred embodiment of the present invention.

FIG. 2 shows a process 200 for wireless network device 102 according to a preferred embodiment of the present invention. Process 200 describes the operation of wireless network device for a single data flow, and is preferably replicated for other data flows (for example, data flows with other destinations, priorities, and the like). Each process 200 then executes simultaneously and independently.

Referring to FIG. 2, input circuit 116 of host 106 receives an MSDU to be transmitted over WLAN 104 (step 202). The source of the MSDUs can be internal to wireless network device 102, for example as an application executing on control circuit 110, or can be external to wireless network device 102.

Control circuit 110 of host 106 determines whether the MSDU should be aggregated as an A-MSDU with other MSDUs prior to transfer to device 108, preferably by monitoring one or more conditions, such as characteristics of the MSDU traffic. One such condition is the rate at which the MSDUs are received by input circuit 116. Preferably the receive rate is determined by defining a temporal evaluation window having a fixed duration. The evaluation window should be long enough to discount short traffic bursts and short enough to enable aggregation quickly after MSDU traffic begins to arrive. For example, the duration of the evaluation window can be on the order of one second.

When the MSDU receive rate exceeds a predetermined receive rate threshold, control circuit 110 enables MSDU aggregation. The receive rate threshold should be large enough that aggregation is not enabled for typical periodic traffic scenarios. For example, the receive rate threshold can be on the order of one thousand MSDUs per second.

Another condition control circuit 110 can monitor to determine whether MSDUs should be aggregated is the occupancy level of output circuit 114. Output circuit 114 preferably comprises a queue to store MSDUs and A-MSDUs for transfer to device 108, preferably under the control of control circuit 120 of device 108. When a number of the MSDUs present in output circuit 114 is greater than a predetermined threshold amount, control circuit 110 enables MSDU aggregation. In various embodiments control circuit 110 uses one or both of these conditions (receive rate and output circuit 114 occupancy level) to determine when aggregation should be enabled. In some embodiments, to enable MSDU aggregation, control circuit 110 asserts an aggregation enable signal over control channel 130, which is received by aggregation circuit 112 and input circuit 116.

When MSDU aggregation is not enabled (step 204), input circuit 116 simply transfers the MSDU to output circuit 114 (step 206) and returns to step 202. But when MSDU aggregation is enabled (step 204), input circuit 116 transfers the MSDU to queue 118 for aggregation. Aggregation circuit 112 adds the MSDU to the A-MSDU currently being generated (step 208), which then comprises that MSDU and zero or more other MSDUs.

As each A-MSDU is generated, aggregation circuit 112 monitors one or more conditions to determine whether aggregation is complete for that A-MSDU (step 210). If one or more further MSDUs are to be aggregated into the current A-MSDU, process 200 resumes at step 202. But if aggregation is done, aggregation circuit 112 transfers the A-MSDU to output circuit 114 (step 212).

One condition aggregation circuit 112 can monitor is the size of the A-MSDU being generated relative to a maximum allowed size for the A-MSDU. The maximum allowed size can be predetermined, but is preferably negotiated with the recipient of the A-MSDU. For example, the maximum allowed size for the A-MSDU can be on the order of 8 kB or 4 kB. When traffic flows at a steady rate, this is sufficient to ensure that A-MSDUs are transferred in a timely manner. However, this is rarely the case. Any interruption in traffic flow can cause the A-MSDU being generated to stay in queue 118 long enough to increase latency and possibly reduce throughput. Aggregation circuit 112 therefore preferably monitors one or more other conditions to determine when to transfer the A-MSDU being generated to output circuit 114 for transfer to device 108.

Another condition aggregation circuit 112 can monitor is an aggregation timeout, which occurs when a maximum interval allowed for generation of an A-MSDU elapses. The aggregation timeout interval preferably begins when queue 118 is empty when receiving a MSDU. When the aggregation timeout interval elapses, aggregation circuit 112 transfers the A-MSDU being generated to output circuit 114 for transfer to device 108. The aggregation timeout interval can be fixed in advance based on empirical analysis, or can be adaptively determined during run-time based on traffic conditions.

In some embodiments the timer that implements the aggregation timeout interval is implemented in host 106. However, when control circuit 110 of host 106 is implemented as a processor executing a non-real-time operating system, timer granularity can be on the order of 10 milliseconds, which is too coarse for high-speed communications. Therefore the timer is preferably implemented by control circuit 120 of device 108, which preferably operates in real time, thereby permitting aggregation timeout intervals on the order of 500 microseconds. Control circuit 120 preferably asserts a timeout signal at the end of each aggregation timeout interval. The timeout signal is preferably received by aggregation circuit 112 of host 106 over control channel 130.

In some embodiments, control circuit 120 of device 108 modifies the duration of the aggregation timeout interval during run-time based on one or more conditions. One such condition is the timeout rate, which is the rate at which the aggregation timeout interval elapses. Another such condition is the gap (that is, the duration of the interval) between an aggregation interval timeout and the time at which input circuit 122 of device 108 receives the next A-MSDU. If the timeout rate is high, and the gap is small, then the aggregation timeout interval is preferably increased until the timeout rate becomes very low. One possible implementation is given by the code listed below.

Initialize timeout to a low value
While (1)
{
Compute number of timeouts and average next packet gap in one second
If number of timeouts>threshold1 and average next packet gap<threshold2
Increase timeout
If number of timeouts is zero in the last N seconds
Decrease timeout slightly
}

Another condition that aggregation circuit 112 can monitor to determine when to transfer the A-MSDU being generated to output circuit 114 is the number of aggregate packets present in input circuit 122 of device 108. Preferably input circuit 122 comprises a queue which device 108 fills by transferring MSDUs or A-MSDUs (depending on whether aggregation is enabled) from output circuit 114 of host 106. When the number of A-MSDUs present in input circuit 122 falls below a predetermined threshold, control circuit 120 of device 108 preferably asserts a "hungry" signal over control channel 130. In response, aggregation circuit 112 can flush queue 118 by transferring the A-MSDU therein to output circuit 114, where the A-MSDU becomes available to device 108.

In some embodiments of the present invention, control circuit 110 of host 106 modifies the maximum allowed size for the A-MSDU based on one or more conditions during run time in order to increase performance. One such condition is a burst size of the MSDUs received by input circuit 116 of host 106. For example, if the current maximum allowed size for an A-MSDU is 5 MSDUs, but the MSDUs are arriving in bursts of 2 or 3 separated by substantial intervals, the result can be many timeouts and an increase in latency. In such cases, reducing the maximum allowed size for the A-MSDU to 2 or 3 MSDUs can reduce latency. MSDU burst size is preferably monitored by measuring the inter-packet gaps between the MSDUs.

Another condition on which control circuit 110 of host 106 can base the maximum allowed size for an A-MSDU is the transmit data rate of WLAN PHY 126 of device 108, which is preferably reported to control circuit 110 over control channel 130. The instantaneous supported PHY rate in an 802.11 wireless system depends on the distance between the communicating devices and other factors influencing the radio channel. A PHY rate adaptation algorithm adapts continuously monitors these conditions to select the optimal PHY transmit rate, as is well-known in the relevant arts.

Another condition on which control circuit 110 of host 106 can base the maximum allowed size for the A-MSDU is the maximum allowed duration of transmission of an A-MSDU, which can be set to comply with applicable standards, to increase performance, and the like. For example, control circuit 110 can select the maximum allowed size for the A-MSDU as the product of the maximum allowed duration of transmission of an A-MSDU and the current PHY transmit rate.

Another condition on which control circuit 110 of host 106 can base the maximum allowed size for the A-MSDU is the packet error rate reported by a device receiving the data. The packet error rate can be used to limit the maximum allowed size for an A-MSDU, the maximum allowed duration of transmission of an A-MSDU, and the like.

Figure 3B:
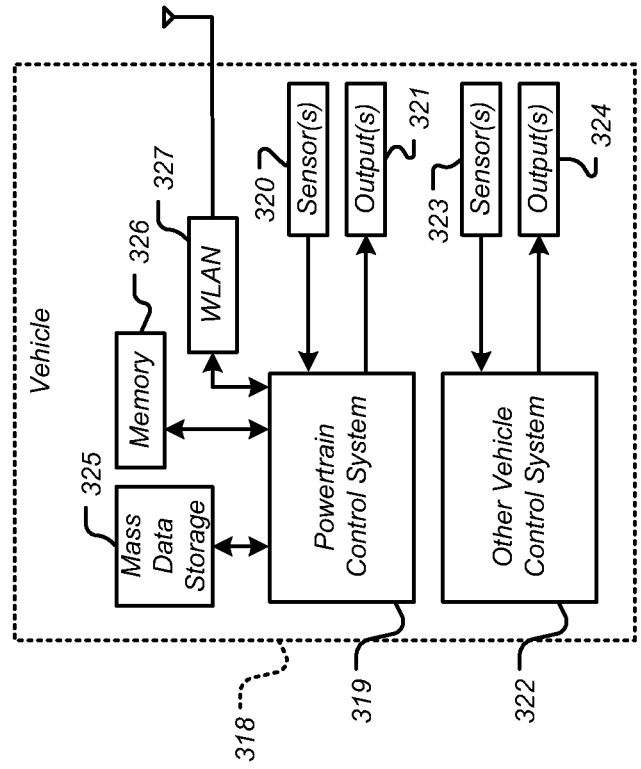
FIGS. 3A-3E show various exemplary implementations of the present invention.
Figure 3A:
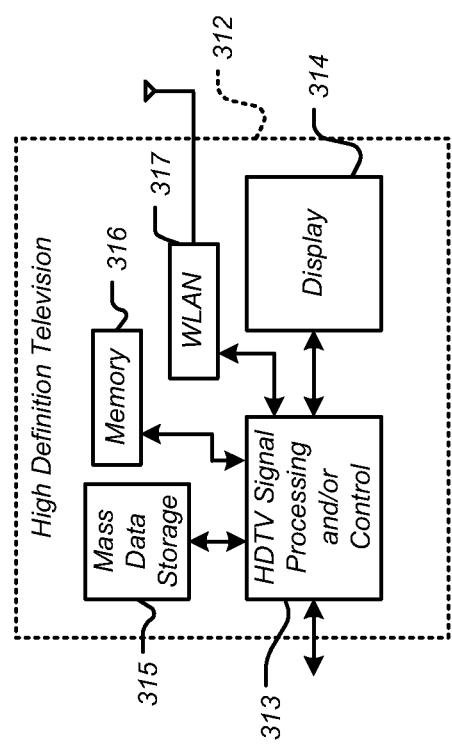

FIGS. 3A-3E show various exemplary implementations of the present invention. Referring now to FIG. 3A, the present invention can be implemented in a high definition television (HDTV) 312. The present invention may implement either or both signal processing and/or control circuits, which are generally identified in FIG. 3A at 313, a WLAN interface and/or mass data storage of the HDTV 312. The HDTV 312 receives HDTV input signals in either a wired or wireless format and generates HDTV output signals for a display 314. In some implementations, signal processing circuit and/or control circuit 313 and/or other circuits (not shown) of the HDTV 312 may process data, perform coding and/or encryption, perform calculations, format data and/or perform any other type of HDTV processing that may be required.

The HDTV 312 may communicate with mass data storage 315 that stores data in a nonvolatile manner such as optical and/or magnetic storage devices. The HDD may be a mini HDD that includes one or more platters having a diameter that is smaller than approximately 1.8". The HDTV 312 may be connected to memory 316 such as RAM, ROM, low latency nonvolatile memory such as flash memory and/or other suitable electronic data storage. The HDTV 312 also may support connections with a WLAN via a WLAN network interface 317.

Referring now to FIG. 3B, the present invention implements a control system of a vehicle 318, a WLAN interface and/or mass data storage of the vehicle control system. In some implementations, the present invention implements a powertrain control system 319 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 322 of the vehicle 318. The control system 322 may likewise receive signals from input sensors 323 and/or output control signals to one or more output devices 324. In some implementations, the control system 322 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 319 may communicate with mass data storage 325 that stores data in a nonvolatile manner. The mass data storage 325 may include optical and/or magnetic storage devices for example hard disk drives HDD and/or DVDs. The HDD may be a mini HDD that includes one or more platters having a diameter that is smaller than approximately 1.8". The powertrain control system 319 may be connected to memory 326 such as RAM, ROM, low latency nonvolatile memory such as flash memory and/or other suitable electronic data storage. The powertrain control system 319 also may support connections with a WLAN via a WLAN network interface 327. The control system 322 may also include mass data storage, memory and/or a WLAN interface (all not shown).

Figure 3C:
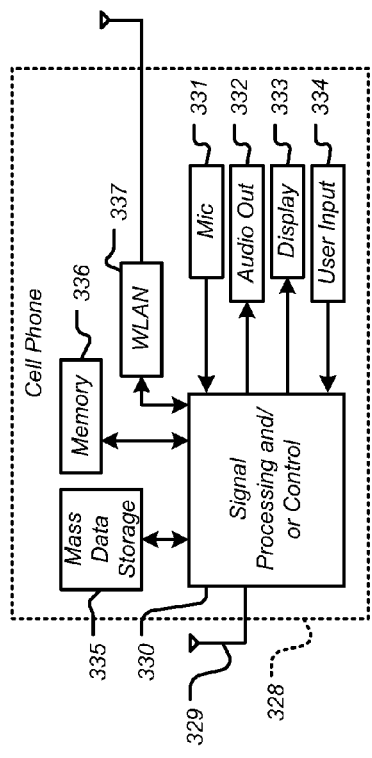

Referring now to FIG. 3C, the present invention can be implemented in a cellular phone 328 that may include a cellular antenna 329. The present invention may implement either or both signal processing and/or control circuits, which are generally identified in FIG. 3C at 330, a WLAN interface and/or mass data storage of the cellular phone 328. In some implementations, the cellular phone 328 includes a microphone 331, an audio output 332 such as a speaker and/or audio output jack, a display 333 and/or an input device 334 such as a keypad, pointing device, voice actuation and/or other input device. The signal processing and/or control circuits 330 and/or other circuits (not shown) in the cellular phone 328 may process data, perform coding and/or encryption, perform calculations, format data and/or perform other cellular phone functions.

The cellular phone 328 may communicate with mass data storage 335 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 328 may be connected to memory 336 such as RAM, ROM, low latency nonvolatile memory such as flash memory and/or other suitable electronic data storage. The cellular phone 328 also may support connections with a WLAN via a WLAN network interface 337.

Figure 3D:
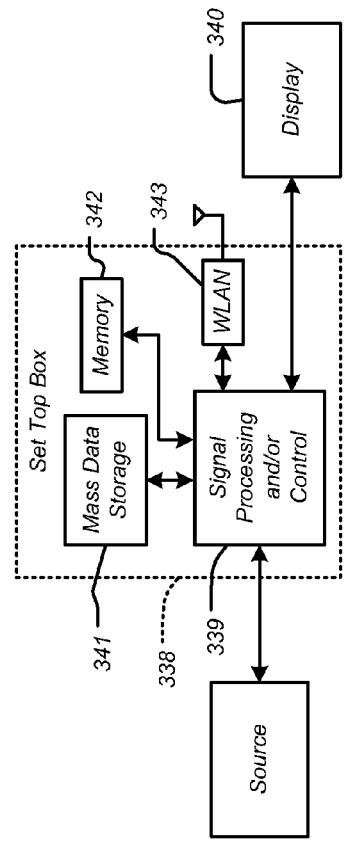

Referring now to FIG. 3D, the present invention can be implemented in a set top box 338. The present invention may implement either or both signal processing and/or control circuits, which are generally identified in FIG. 3D at 339, a WLAN interface and/or mass data storage of the set top box 338. The set top box 338 receives signals from a source such as a broadband source and outputs standard and/or high definition audio/video signals suitable for a display 340 such as a television and/or monitor and/or other video and/or audio output devices. The signal processing and/or control circuits 339 and/or other circuits (not shown) of the set top box 338 may process data, perform coding and/or encryption, perform calculations, format data and/or perform any other set top box function.

The set top box 338 may communicate with mass data storage 343 that stores data in a nonvolatile manner. The mass data storage 343 may include optical and/or magnetic storage devices for example hard disk drives HDD and/or DVDs. The HDD may be a mini HDD that includes one or more platters having a diameter that is smaller than approximately 1.8". The set top box 338 may be connected to memory 342 such as RAM, ROM, low latency nonvolatile memory such as flash memory and/or other suitable electronic data storage. The set top box 338 also may support connections with a WLAN via a WLAN network interface 343.

Figure 3E:
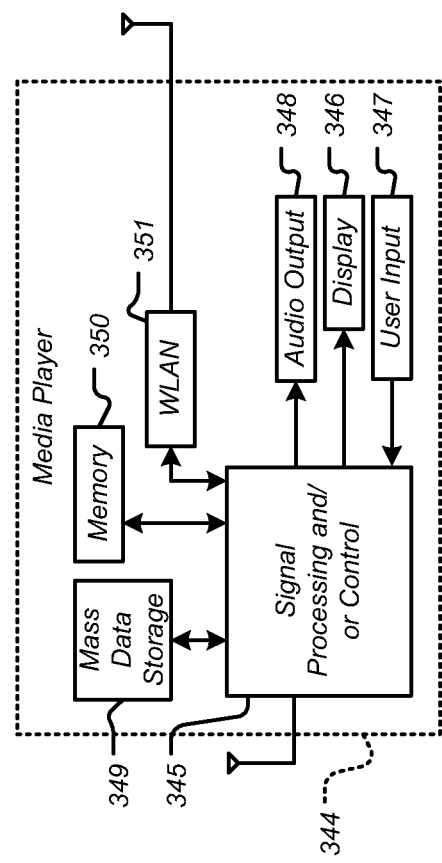

Referring now to FIG. 3E, the present invention can be implemented in a media player 344. The present invention may implement either or both signal processing and/or control circuits, which are generally identified in FIG. 3E at 345, a WLAN interface and/or mass data storage of the media player 344. In some implementations, the media player 344 includes a display 346 and/or a user input 347 such as a keypad, touchpad and the like. In some implementations, the media player 344 may employ a graphical user interface (GUI) that typically employs menus, drop down menus, icons and/or a point-and-click interface via the display 346 and/or user input 347. The media player 344 further includes an audio output 348 such as a speaker and/or audio output jack. The signal processing and/or control circuits 345 and/or other circuits (not shown) of the media player 344 may process data, perform coding and/or encryption, perform calculations, format data and/or perform any other media player function.

The media player 344 may communicate with mass data storage 349 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 344 may be connected to memory 350 such as RAM, ROM, low latency nonvolatile memory such as flash memory and/or other suitable electronic data storage. The media player 344 also may support connections with a WLAN via a WLAN network interface 351. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
   an input circuit configured to receive packets;
   a control circuit configured to enable aggregation when a rate at which the input circuit receives the packets is greater than a predetermined rate;
   a queue configured to store the packets from the input circuit when aggregation is enabled;
   an aggregation circuit configured to generate aggregate packets when aggregation is enabled, wherein the aggregation circuit is configured to generate each of the aggregate packets by aggregating at least one of the packets stored in the queue; and
   an output circuit configured to receive (i) the aggregate packets when aggregation is enabled and (ii) the packets from the input circuit when aggregation is disabled,
   wherein the aggregation circuit is configured to generate the aggregate packets in response to receiving a signal from a wireless transmitter, and wherein the signal indicates that a level of data queued by the wireless transmitter is less than a predetermined threshold.

2. The apparatus of claim 1, wherein the control circuit is configured to determine the rate during an evaluation window having a predetermined length.

3. The apparatus of claim 1, wherein the control circuit is configured to enable aggregation when a number of the packets present in the output circuit is greater than a first predetermined threshold number.

4. The apparatus of claim 1, wherein the aggregation circuit is configured to generate each of the aggregate packets by aggregating all of the packets stored in the queue when the aggregate packet is generated.

5. The apparatus of claim 1, wherein the aggregation circuit is configured to generate the aggregate packets based on a maximum aggregate packet size.

6. The apparatus of claim 5, wherein the control circuit is configured to negotiate the maximum aggregate packet size with a recipient of the aggregate packets.

7. The apparatus of claim 5, wherein the control circuit is configured to adjust the maximum aggregate packet size in response to a measured burst size of the packets received at the input circuit.

8. The apparatus of claim 5, wherein the control circuit is configured to adjust the maximum aggregate packet size in response to a transmit data rate of the wireless transmitter.

9. The apparatus of claim 8, wherein the control circuit is configured to set the maximum aggregate packet size based on a maximum transmission duration and the transmit data rate.

10. The apparatus of claim 5, wherein the control circuit is configured to adjust the maximum aggregate packet size in response to a transmission error rate.

11. The apparatus of claim 5, wherein the aggregation circuit is configured to generate the aggregate packets in response to aggregation timeouts, wherein an aggregation timeout interval begins when the queue is (i) empty and (ii) receives one of the packets from the input circuit.

12. The apparatus of claim 11, wherein the control circuit is configured to modify a length of the aggregation timeout interval in response to a rate at which the aggregation timeouts occur.

13. The apparatus of claim 11, wherein the control circuit is configured to modify a length of the aggregation timeout interval in response to a measured delay between (i) generation of one of the aggregate packets resulting from one of the aggregation timeouts and (ii) generation of a subsequent one of the aggregate packets.

14. A method comprising:
receiving packets at an input circuit;
enabling aggregation when a rate at which the input circuit receives the packets is greater than a predetermined rate;
storing the packets from the input circuit when aggregation is enabled;
when aggregation is enabled, generating aggregate packets, wherein each of the aggregate packets is generated by aggregating at least one of the stored packets;
outputting (i) the aggregate packets when aggregation is enabled and (ii) the packets from the input circuit when aggregation is disabled; and
generating the aggregate packets in response to receiving a signal from a wireless transmitter, wherein the signal indicates that a level of data queued by the wireless transmitter is less than a predetermined threshold.

15. The method of claim 14, further comprising determining the rate during an evaluation window having a predetermined length.

16. The method of claim 14, further comprising enabling aggregation when a number of the packets waiting for the outputting is greater than a first predetermined threshold number.

17. The method of claim 14, further comprising generating each of the aggregate packets by aggregating all of the stored packets present when the aggregate packet is generated.

18. The method of claim 14, further comprising generating the aggregate packets based on a maximum aggregate packet size.

19. The method of claim 18, further comprising negotiating the maximum aggregate packet size with a recipient of the aggregate packets.

20. The method of claim 18, further comprising adjusting the maximum aggregate packet size in response to a measured burst size of the packets received at the input circuit.

21. The method of claim 18, further comprising adjusting the maximum aggregate packet size in response to a transmit data rate of the wireless transmitter.

22. The method of claim 21, further comprising setting the maximum aggregate packet size based on a maximum transmission duration and the transmit data rate.

23. The method of claim 18, further comprising adjusting the maximum aggregate packet size in response to a transmission error rate.

24. The method of claim 18, further comprising generating the aggregate packets in response to aggregation timeouts, wherein an aggregation timeout interval begins when (i) no packets are presently stored and (ii) one of the packets is received from the input circuit.

25. The method of claim 24, further comprising modifying a length of the aggregation timeout interval in response to a rate at which the aggregation timeouts occur.

26. The method of claim 24, further comprising modifying a length of the aggregation timeout interval in response to a measured delay between (i) generation of one of the aggregate packets resulting from one of the aggregation timeouts and (ii) generation of a subsequent one of the aggregate packets.

* * * * *